United States Patent [19]

Youn et al.

[11] 4,298,540
[45] Nov. 3, 1981

[54] PROCESS FOR OILSEED EXTRACTION WITH AN ISOPROPANOL-BASED SOLVENT

[75] Inventors: Kun C. Youn; Dale J. Wilpers, both of Houston, Tex.

[73] Assignee: Shell Oil Company, Houston, Tex.

[21] Appl. No.: 216,418

[22] Filed: Dec. 15, 1980

[51] Int. Cl.$^3$ .............................................. A23J 1/14
[52] U.S. Cl. .................................................. 260/412.4
[58] Field of Search ..................................... 260/412.4

[56] References Cited
PUBLICATIONS

W. D. Harris, et al. "Isopropanol as a Solvent for Extraction of Cottonseed Oil", *J. Am. Oil Chem. Soc., vol. 24, pp. 370–375 (Nov. 1947)*.
Ibid, vol. 26, pp. 719–723 (Dec. 1949).
Ibid, vol. 27, pp. 273–275 (Jul. 1950).

*Primary Examiner*—John F. Niebling

[57] ABSTRACT

A simplified, energy efficient process for regulating the composition of recycle solvent obtained by the phase separation of the extract of oilseed extraction with an isopropanol-based solvent. In the extraction of oilseeds with such a solvent, there is obtained, by cooling of the extract, a solvent-rich liquid phase. The invention provides for regulation of the composition of this phase for purposes of solvent recycle by a process which comprises steps for dividing the phase into a first fraction (between about 60 and 95 percent) and a second fraction (between about 5 and 40 percent), directly recycling the first fraction as solvent for further extraction, distilling the second fraction to recover an overhead vapor-consisting essentially of a constant boiling mixture of isopropyl alcohol and water and a bottoms liquid, and condensing and recycling said overhead as solvent for further extraction. In combination, the first fraction and overhead product solvent recycle streams have a very desirable composition of several extraction system components.

5 Claims, 2 Drawing Figures

PROCESS FOR OILSEED EXTRACTION WITH AN ISOPROPANOL-BASED SOLVENT

BACKGROUND OF THE INVENTION

The present invention relates to improvement in certain processes for the solvent extraction of oils from oil-containing seeds such as, for example, soybean, cottonseed, corn, peanut, safflower, sunflower, and palm.

The oilseed industry of the United States produces on an annual basis about thirteen million tons of seedoils from roughly one billion bushels of seed crops, predominantly soybean and cottonseed. Essentially all of this oil is recovered from the seeds by solvent extraction. The oils find primary use in foods, e.g., shortening, margarine, cooking oils, and salad oils, while seed meal from which the oil has been extracted, having a high protein content, is generally processed into animal feeds. About two percent of this meal is further refined for human consumption.

In the recovery of seed oils, the industry consumes large quantities of extraction solvent. Hexane has long been recognized as the standard solvent in the industry, due in part to its low cost relative to other solvents and in part to its physical and chemical properties. However, in recent years incentive has developed for the replacement of hexane as the solvent of choice for oilseed extraction. Increasing hexane costs and possibilities of supply shortages account for some of this incentive. In addition, for health and safety reasons, solvent specifications in the industry, precautions to prevent exposure of workers to hexane, and relevant hydrocarbon emission standards may be tightened. Furthermore, interest in producing an upgraded seed meal, for instance a meal suitable for human consumption without the need for secondary extraction or other refining, has given rise to attempts at use of alternate extraction solvents.

Of particular relevance to the present invention is the prior art relating to extraction of oilseeds with an isopropanol-based solvent. Characteristics of isopropanol extraction are generally well known and are described, for instance, by Harris et al. in a three-part publication entitled "Isopropanol as a Solvent for Extraction of Cottonseed Oil" (J. Am. Oil Chem. Soc., November 1947, Vol. 24, p. 370-375; December 1949, Vol. 26, p. 719-723; and July 1950, Vol. 27, p. 273-275).

One recognized problem associated with the use of isopropanol for oilseed extraction relates to separation of the oil/solvent extract resulting from the contact of seeds and solvent. Under conventional practice with hexane, there is produced an oil/solvent extract solution from which solvent is removed by evaporation. The recovered hexane solvent may be directly recycled for further extraction service. However, since the latent heat of vaporization of isopropanol is substantially greater than that of hexane, evaporation of isopropanol from the extract obtained upon extraction of oilseeds with an isopropanol-based solvent is impractical from the standpoint of energy consumption. It is known in the art that an energy efficient solution potentially exists to this problem of recovery of isopropanol extraction solvents for recycle. For instance, in the above-referenced publications, Harris et al describe a method for removal of isopropanol solvent from the extract which does not require its evaporation. It is noted that when aqueous isopropanol of a concentraton of about 91 percent by volume, equivalent to about 88 percent by weight, calculated on the content of isopropanol and water, is used as extraction solvent there results an extract from which solvent can be recovered simply by cooling and phase separating. A solvent phase is thereby obtained which typically comprises approximately 75 percent of the solvent originally introduced into the extraction zone. Of the remainder, a small portion stays with the oil phase while the rest is absorbed by the seed meal during extraction.

Although phase separation of the seedoil/isopropanol-based solvent extract is of substantial advantage with respect to process energy requirements it does not yield a recovered solvent phase suitable for direct recycle to further seed extractions. In addition to desired oils, the oilseeds processed by extraction contain other components, e.g., water, free fatty acids, carbohydrates, phospholipids, sterols, etc., which are extracted by isopropanol solvents and tend to build-up in any phase-separated recycle solvent stream and interfere with extraction performance. It is the general object of this invention to provide an improved process for the treatment of the solvent that is phase-separated from the seedoil/isopropanol extract to obtain a solvent suitable for recycle.

For the conventional process in which oilseeds are contacted with an isopropanol-based solvent to produce an extract that is subsequently cooled and separated into solvent and oil liquid phases, the art provides suggestion that numerous aspects of the solvent composition may be important to process function. Because recycle of phase-separated solvent provides the major part of the extraction solvent in any efficient extraction process, particular attention must be given to these aspects of solvent composition in the processing of recycle solvent according to the invention. It is considered most desirable in the art to have a certain balance of isopropanol and water in the extraction solvent that is contacted with the oilseeds. It is known, for instance, that extraction solvents having a high concentration of isopropanol relative to water, e.g., solvents with isopropanol content greater than about 95% by weight, calculated on total isopropanol and water, may excessively dehydrate the seeds during extraction and cause their disintegration into fines which interfere with downstream processing of both meal and extract. It is also known that one of the recognized advantages of isopropanol-based extraction solvents is their ability to extract and fix certain anti-nutritional toxins (for example, gossypol in cottonseed) that are not removed or fixed by hexane solvents. The efficiency of the removal and fixing of these toxins is known to be related to the presence of significant quantities of water in the solvent. Water in the isopropanol-based extraction solvent is also known to improve meal quality through a denaturing effect on the proteins therein. Furthermore, as a consideration particularly relevant to recycle of the recovered solvent, it is difficult to maintain, under conditions in which water is extracted from the seeds, a concentration of isopropanol in the recycle solvent greater than about 88 percent by weight, based on total isopropanol and water. At this concentration isopropanol forms a constant boiling mixture with water, and solvents with higher concentrations of isopropanol are obtained only by special processing, e.g., azeotropic distillation. On the other hand, although the solvent desirably contains water for these several reasons, it is recognized that the solubility of seedoils in isopropanol-based solvents decreases as the relative proportion of water to isopropanol in the solvent is increased, and that solvents having, for instance, an isopropanol content less than about 75% by weight, calculated on total isopropanol and water, are not effective in accomplishing the desired degree of extraction of oil from the seeds.

The presence in a phase-separated solvent of other non-oil substances extracted from the seeds is also known to influence overall extraction process performance if this solvent is recycled. It is known that build-up in the recycle solvent of impurities such as carbohydrates tends to decrease the solubility of oil in the solvent. However, it has also been observed that high levels of free fatty acids in the solvent enhance oil solubility therein. Still, it has further been found that excessive free fatty acids in the extraction system may increase the miscibility of oil and solvent to the point that it adversely effects the desired extract phase separation. It is also generally the case that relatively high levels of free fatty acids in the solvent result in a phase-separated oil having high fatty acid content. The oil product is then of low quality and subject to chemical instability.

It is the particular object of this invention to provide an energy efficient process which regulates the composition of the solvent that is phase-separated from the extract obtained during extraction of oilseeds with an isopropanol-based solvent to prepare a recycle solvent having a desired balance of the various components, e.g., water, free fatty acids, carbohydrates, etc., extracted from the seeds along with seedoils. In this regard, it is known in the art, e.g., from the work of Harris et al, that the concentration of water in the phase-separated recycle solvent can be regulated by extracting only seeds which have undergone a pre-treatment to adjust their moisture content to a specified level, i.e., ten percent by weight, that is said to be in equilibrium with that of the solvent. Furthermore, build-up of the content of free fatty acids, carbohydrates, and other non-oil substances in the phase-separated recycle stream can be controlled by removal of a bleed stream from the process. No differentiation was attempted between removal of free fatty acids and carbohydrates and other impurities, and success of the process was still said to be dependent to some extent upon free fatty acid content of the particular oilseed feedstock.

SUMMARY OF THE INVENTION

The present invention is an improvement in known procedures for recycle of isopropanol-based solvent in oilseed extraction processes, providing for regulation of the composition of the phase-separated recycle solvent, particularly with respect to its content of water, free fatty acids, and other non-oil components of the seeds. In brief summary, it may be said that in the process for the recovery of oils from seeds containing extractable oils, comprising steps for contacting seeds having a water content of between about 9 and 13 percent by weight with an isopropanol-based extraction solvent in an extraction zone to obtain an extract of desired seedoils in the solvent, cooling the extract, phase-separating the cooled extract into a lower liquid oil phase which is rich in seedoils and an upper liquid solvent-rich phase, the invention is the improvement which comprises dividing the recovered solvent phase of the phase-separation into a first division fraction containing between about 60 and 95 percent of the solvent phase and a second division fraction containing between about 5 and 40 percent of the solvent phase, directly recycling said first division fraction to the extraction zone, distilling the second division fraction to yield a distillation bottoms liquid product and a distillation overhead product which consists essentially of a constant boiling mixture of isopropyl alcohol and water, and recycling said distillation overhead product to the extraction zone. The process yields as the desired recycle solvent a combination of said first division fraction and said distillation overhead product which has a proper balance of isopropanol, water, and free fatty acids, i.e., an isopropanol content of between 75 and 89 percent by weight, calculated on the total weight of isopropanol and water, and a free fatty acid content of between about 0.02 and 3.0 percent by weight, based on the total recycle solvent. This recycle solvent furthermore has an acceptably low content of carbohydrates and other impurities that are extracted from the seeds.

The process of the invention is of particular advantage in producing from the solvent phase recovered from the seedoil extract a mixture suitable for recycle, without the need for full refining of the recovered solvent and its attendant energy consumption. Since only a minor portion of the recovered solvent phase is distilled in operation of the invention, energy requirements are comparable to or less than those of recycle solvent recovery in hexane-based oilseed extraction processes.

In addition, the process accomplishes, through performance of but a single operation, regulation of a proper composition of the isopropanol-based solvent with respect to the several substances which tend to accumulate in the solvent as a result of seed extraction. Thus, there is no need to practice steps for regulation of the content of water in the recycle solvent that are distinct from the measures taken to remove free fatty acids or carbohydrates or other extracted impurities.

Overall, under practice according to the invention, particular advantage is taken of a discovery that the recycle solvent content of water and the content of free fatty acids need not, under specified process conditions, be independently controlled. It is found that water and free fatty acid in the solvent provide offsetting solubility effects during both oilseed extraction and extract phase separation, so that limited build-up of one in the solvent is acceptable if accompanied by limited build-up of the other. Moreover, process performance according to the invention is signficantly less dependent upon free fatty acid content of the feedstock.

DESCRIPTION OF THE DRAWINGS

Aspects of the invention summarily described above are further illustrated in the attached FIG. 1 and FIG. 2. There depicted are representations of two embodiments of the invention in schematic flow diagram fashion. It is to be understood that the drawings omit a detailed showing of equipment, instrumentation, valving, etc., which would be used in practice of the process, as such matters will be readily apparent to those skilled in the oilseed extraction and related processing arts. It should further be understood that while the embodiments here shown are characterized by continuous process operation, the invention can similarly be operated in a batch or semi-continuous mode.

With particular reference to FIG. 1, which depicts general aspects of the invention, the meats of oilseeds, as an example soybeans, are introduced via the line designated 10 into an extraction zone, represented by the numeral I. In accordance with known techniques of oilseed processing, the meats are typically in the form of thin flakes and have a moisture content of between about 9 and 13 percent by weight. Also introduced into the extraction zone via line 59 is a quantity of isopropanol extraction solvent. Contact of seeds and solvent in zone I produces an extract solution 21 containing sovlent and materials extracted from the seeds, e.g., primarily oils but also including water, free fatty acids, carbohydrates, etc. The extract is cooled in cooling zone II and the resulting cooled extract 22 is phase-separated into a lower oil-rich phase, which is withdrawn from the process as stream 36, and an upper solvent-rich phase. For purposes of preparing a solvent stream suitable for recycle in accordance with the object of the invention, the solvent phase is withdrawn from zone III as stream 31 and divided into a first division fraction 41, containing between about 60 and 95 percent of the solvent phase, and a second division fraction 42, containing the remaining 5 to 40 percent of the solvent phase. The second division fraction is introduced into distillation zone IV where it is separated into a distillation bottoms product that is withdrawn from the process illustrated via line 48 and a distillation overhead product 43 that consists essentially of a constant boiling mixture of isopropanol (about 88 percent by weight) and water (about 12 percent by weight). Stream 43, in the process embodiment shown, is combined with stream 41 to yield the desired recycle solvent stream 52 having a proper balance of isopropanol, water, fatty acids, and carbohydrates and other impurities. In the continuous process embodiment depicted in FIG. 1, stream 52 is added to stream 57, which comprises fresh make-up solvent and, optionally, other process recycle streams, to form the total extraction solvent 59 that is introduced into the extraction zone.

DESCRIPTION OF THE PREFERRED EMBODIMENTS

Figure 1:
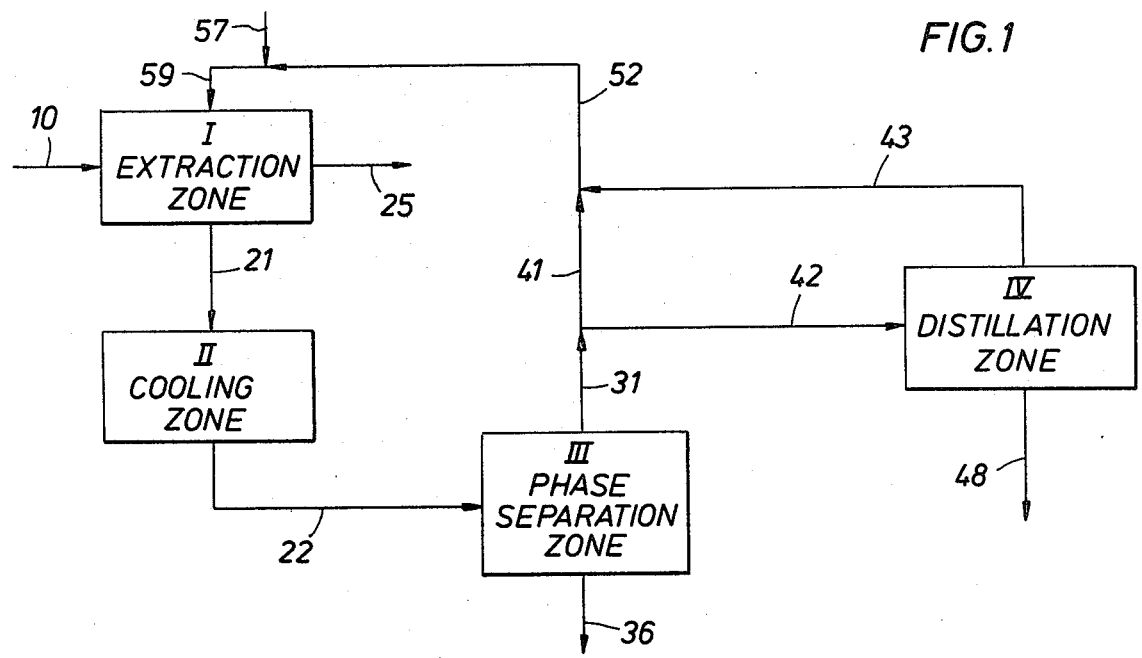

In its broadest sense, the improvement according to the invention finds application in processes of the sort in which an oilseed feedstock is contacted with an isopropanol-based solvent to produce an extract that is subsequently cooled and separated into an oil-rich phase and a solvent phase. In the context of such a process, the invention is directed only to treatment of this solvent phase to provide a solvent stream suitable for continuous recycle to the contact step. The contact, cooling, and phase separation steps that are practiced in conjunction with this treatment of the solvent for recycle are not considered part of the invention and may, in general, be suitably carried out employing conventional equipment and procedures as are well known in the oilseed extraction art. Equipment and procedures preferred for use in the extractive recovery of seedoil with isopropanol-based solvents are described, for instance, by Harris et al. in the above-referenced publications, the teachings of which are incorporated heren by reference. Illustrative examples of known processing conditions are extraction zone temperatures in the range of about 60° to 95° C., a weight ratio of the isopropanol-based solvent to the seeds introduced into the extraction zone of between about 0.7 and 2.5, a temperature for phase separation purposes of about 5° to 40° C., and sufficient pressure throughout the extraction, cooling, and phase-separation steps to maintain the solvent and the extracted oils substantially in the liquid state, preferably atmospheric or greater pressure.

It is a common characteristic of prior art oilseed extraction processes that the seeds introduced into the extraction zone have been pre-conditioned to an average moisture content of between about 9 and 13 percent by weight. Such a moisture content allows the seeds to be readily flaked before extraction. A restriction on the processing of seeds having a water content within this range is necessary to the successful performance of the instant invention, though for reasons not associated with conventional practice. For purposes of the invention, processing of seeds having a moisture content within the 9 to 13 percent by weight range is necessary to the desired simultaneous regulation of the content of the several components in the recycle solvent. It is considered of particular benefit that this limitation on the invention corresponds to established practice in the art with respect to water content of the oilseed feedstock. Preferably, the seeds introduced into the extraction zone in practice of the invention have an average moisture content between about 10 and 12 percent by weight. Although the process of the invention provides benefit over a broader range of operation, it is particularly preferred for use in the extraction of seed feedstocks having more than 10 percent by weight water, and further having a moisture content higher than that which is in equilibrium with the extraction solvent so that the solvent phase obtained by phase separation of the extract has a greater concentration of water than the extraction solvent introduced into the extraction zone. Prior art processes have been poorly suited to operation under such conditions.

The extraction solvent is necessarily one based upon isopropanol. It is known that isopropanol-based extractants may comprise in minor amount, i.e., less than about 20 percent by weight (calculated on isopropanol), other solvent materials, e.g., ethanol, acetone, and hexane, having substantial solubility for seedoils. Such solvent mixtures are suitable for use in the invention, provided they yield an extract from which solvent may be effectively recovered by phase separation. Preferably the isopropanol-based solvent utilized in the invention is substantially free of these other materials.

Specifically for purposes of the process improvement that is the present invention, the solvent recovered by cooling and phase separating the oil/solvent extract is divided into a first division fraction containing between about 60 and 95 percent of the extract and a second division fraction containing between about 5 and 40 percent of the extract. The first division fraction is directly recycled to the extraction zone. Recycle of this fraction is direct in the sense that the fraction does not undergo processing for regulation of its content of water, free fatty acids, or carbohydrates and other impurities. Before it is reintroduced into the extraction zone, the first division fraction may, however, be treated in other manners, for instance by filtration, that do not substantially change its composition with respect to the regulated components. The second division fraction is introduced into a distillation zone for separation into a distillation overhead product, consisting essentially of a constant boiling mixture of isopropanol, about 88 percent by weight, and water, about 12 percent by weight, and a distillation bottoms product comprising essentially all of the seedoil, free fatty acids and carbohydrates and other extracted impurities contained in the second division fraction. The distillation zone may be an evaporator, although it is more preferably a distillation column equipped with trays, packing or the like for contact between vapor and liquid flows therein. Most preferably, the distillation zone is a rectification column of generally conventional design and operation, having between about 3 and 30 theoretical contacting stages. Dependent upon the operating conditions of the distillation zone and upon the quality of the separation which it achieves, the composition of the distillation overhead product may vary somewhat from that of the ideal constant boiling mixture. Limited variation in isopropanol and water content of this overhead, for instance, between about 85 and 89 percent by weight isopropanol, based on isopropanol and water, is to be expected and does not, as a rule, substantially interfere with the desired performance of the invention. Similarly, because of non-idealities in the operation of the distillation zone, the overhead may be expected to contain small quantities of free fatty acids, carbohydrates and other less volatile components of the distillation zone feed.

In dividing the solvent phase of extract phase separation into the first and second division fractions it is necessary to the practice of the invention that attention be given to the above-stated relative quantities of the division fractions. A division such that more than about 40 percent of the solvent phase of extract phase separation is routed to the distillation zone requires excessive heat input to the process for distillation purposes and/or loss of isopropanol solvent to the distillation bottoms product. On the other hand, a division such that less than about 5 percent of the solvent phase is introduced into the distillation column does not provide sufficient regulation over the composition of the recycle solvent. The division of the solvent phase, into the first and second fractions, that is optimum for a given oilseed extraction process will depend on a number of factors. For instance, the optimum division is in many cases indicated by the content of water, free fatty acids, carbohydrates, and other isopropanol-extractable substances in the oilseed feedstock. Often control of the water content of the extraction system is considered a most important factor, and the process of the invention is then best operated in such a manner that the second division fraction is a relatively large portion of the solvent phase, i.e., 30 to 40 percent, when the water content of the feedstock is relatively high, i.e., 12 to 13 percent by weight, while this fraction is preferably smaller, i.e., 5 to 20 percent, relative to the total solvent phase, when the water content of the feed stock is low, i.e., 9 to 10 percent. Under preferred operation with a feedstock of moderate water content, i.e., 10 to 12 percent by weight, the second division fraction most preferably consists of between about 15 and 35 percent of the solvent phase while the first fraction consists of the remaining 65 to 85 percent. Under other circumstances, control over other factors, e.g., carbohydrates, may be considered of primary importance, and the flow division for purposes of the invention adjusted accordingly. However, it is an advantageous feature of the function of the invention that, within specified limits on processing conditions, the oil solubility enhancing effects of the free fatty acids in the recycle solvent offset the tendency of water, carbohydrates, and other extracted substances to diminish oil solubility therein. Thus, the benefits of the invention with respect to providing a generally suitable composition of recycle solvent may typically be realized over the full stated range of processing conditions, and precise quantitative control over solvent phase division at any point within the range is not critical. Likewise, the process is characterized by substantial flexibility with respect to proper function during periods of changing oilseed feedstock composition. Furthermore, it may be expected that other aspects of extraction process performance, for example, preparation of an oil having an acceptably low content of extracted impurities such as carbohydrates and a seed meal having low levels of antinutritional toxins and having a desired degree of protein denaturation may be accomplished by operation of the invention throughout the specified range of solvent phase division.

The recycle solvent prepared by practice of the invention, containing the first division fraction and the distillation overhead product obtained by separation of the second division fraction, has the desired content of isopropanol, i.e., between about 75 and 89 percent by weight based on isopropanol and water, the desired content of free fatty acids, i.e., between about 0.02 and 3.0 percent by weight based upon total recycle solvent, and a sufficiently low content of carbohydrates and other impurities extracted from the seeds. In most instances of practice under the invention, the recycle solvent will have a preferred balance of isopropanol, between about 83 and 88 percent by weight based on isopropanol and water, and of free fatty acids, between about 0.04 and 2.0 percent by weight based upon total recycle solvent.

It is to be understood that, while the desired phase-separated recycle solvent is referred to herein as a combination of the first division fraction and the distillation overhead product, this description is intended to be restrictive only in the sense that such a combination has the specified composition of isopropanol, water, free fatty acids, etc. Thus it is not necessary to the invention that the first division fraction and the distillation overhead product be physically combined before they are introduced into the extraction zone. These process streams may be suitably recycled, as called for by the invention, either individually or in physical combination, whichever is most convenient to practice of a particular process embodiment.

Further illustration of the invention is provided by reference to FIG. 2, which illustrates a flow diagram of a more specific embodiment including the general steps of the process represented in FIG. 1, as well as certain additional processing steps as will be described.

Figure 2:
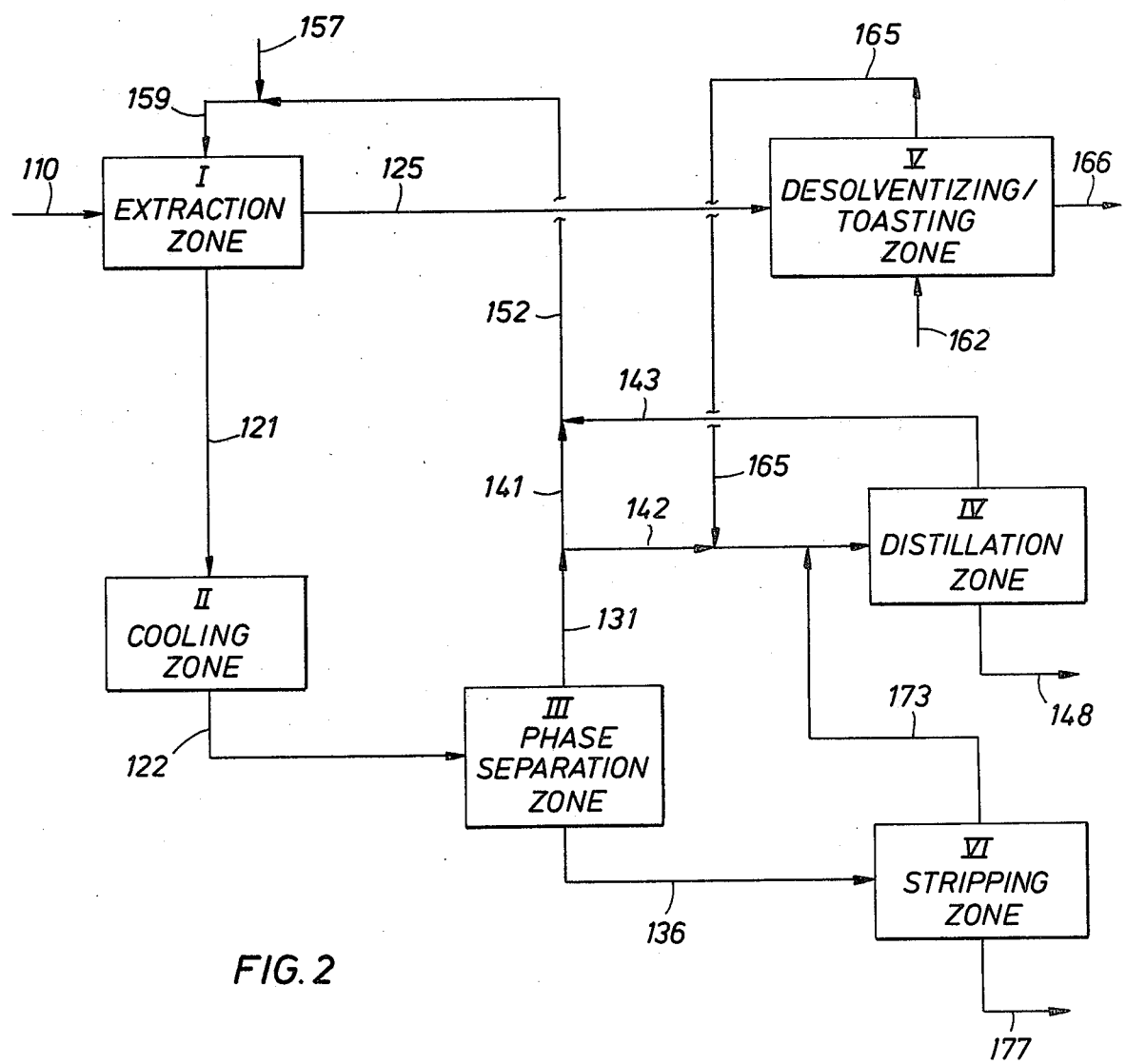
FIG. 2 illustrates a particularly preferred embodiment of the invention, comprising the general processing steps and in addition certain other steps, as will be more fully described below.

In the process illustration of FIG. 2, 100 lb/hr of an oilseed feedstock designated 110 is introduced into the extraction zone I. This feedstock contains about 11 percent water, by weight. Also introduced into the extraction zone is 200 lb/hr of an extraction solvent stream 159, including both recycle and make-up solvent, and having a composition of about 172 lb/hr isopropanol, 23 lb/hr water, 4.4 lb/hr oil, 0.1 lb/hr free fatty acids, and 0.5 lb/hr carbohydrates and other extracted impurities. Contact of seeds and solvent in the extraction zone yields an extract 121, which is then cooled in cooling zone II. Cooled extract 122 is introduced into phase separation zone III for separation into a lower oil-rich phase that is withdrawn as stream 136 and an upper solvent phase that is withdrawn as stream 131. For purposes of this illustration of the invention, division is made of the phase-separated solvent stream 131 such that 75 percent is taken as stream 141 for recycle directly to the extraction zone, while 25 percent is introduced, as stream 142, into the distillation zone IV.

Distillation of this stream alone would yield a distillation overhead product, consisting essentially of 37.5 lb/hr of a constant boiling mixture of isopropanol (about 88 percent by weight) and water (about 12 percent by weight), for recycle. The distillation bottoms product 148 would then comprise between about 0 and 3 lb/hr water, about 0.02 lb/hr free fatty acids, and about 0.1 lb/hr carbohydrates and other impurities. This distillation bottoms stream is withdrawn from the process.

In the embodiment here shown, the distillation zone IV also receives other recovered process solvent streams for treatment in preparation for recycle. These other solvent streams are here recovered from the extracted meal that is withdrawn as stream 125 from the extraction zone and from the lower oil-rich phase that is taken as stream 136 from the phase-separation zone. It is common practice in the art for the extracted meal 125 to be processed, for instance, by heating in a desolventizing/toasting zone V, to separate, e.g., by evaporation, residual solvent therein. This heating also acts to inactivate toxins remaining in the meal after extraction. Steam, 162, is often introduced into zone V to aid in this processing. In the embodiment represented in FIG. 2, the extracted meal is heated under addition via line 162 of about 5 lb/hr steam to effect separation of a recovered meal solvent, stream 165, consisting essentially of about 33 lb/hr isopropanol and about 4.5 lb/hr water. A dry, toasted meal is withdrawn from zone V as stream 166. It is further common practice in the art to treat the oil-rich phase withdrawn as stream 136 from the phase separation zone to recover retained solvent. Specifically, isopropanol in the stream 136 may be stripped or otherwise distilled or evaporated from the oil in stripping zone VI, to produce as overhead stream 173 a recovered oil phase solvent, containing about 3 lb/hr isopropanol and a small quantity of water. An oil product is withdrawn from zone VI, via line 177. It is, of course, desirable to recycle the recovered meal solvent and the recovered oil phase solvent, as well as the solvent phase of extract phase separation. To this end the distillation zone IV may be utilized to adjust the water content of either or both of streams 165 and 173, as well as to provide regulation of the composition of the principal recycle solvent 131 that is obtained from the solvent phase of extract phase separation. Treatment of multiple recovered solvent streams by means of the single distillation zone provides overall process economy and simplifies operations. Still, in the context of the broader invention, such treatment for recycle purposes of solvent recovered from the meal and oil, as shown in FIG. 2, or recovered from elsewhere in the extraction process as a whole, is considered an optional process feature.

Efficient distillation of the combined streams 142, 165, and 173 in zone IV results in an overhead stream 143 comprising substantially all of the isopropanol in stream 142 (33 lb/hr) in stream 165 (33 lb/hr), and in stream 173 (3 lb/hr) together with a total quantity of water (9 lb/hr) in the constant boiling mixture weight ratio of about 88 percent isopropanol and 12 percent water. Also produced is distillation bottoms stream 148, containing about 1.5 lb/hr water, 0.02 lb/hr free fatty acids, 0.1 lb/hr carbohydrates and other impurities and 0.75 lb/hr seedoils. Stream 143, condensed to a liquid, is combined with the first division fraction 141 and with about 1 to 3 lb/hr of a fresh make-up solvent 157, which is, for instance, a mixture of isopropanol and water in about the constant boiling mixture ratio. In view of the rather small quantity of make-up solvent 157 relative to total recycle solvent, e.g., generally less than one part to four parts, respectively, more commonly less than one part to 10 parts, the content of isopropanol and water in the make-up solvent is not critical. A mixture of isopropanol and water containing greater than about 75 percent by weight isopropanol is very suitable. The resulting total extraction solvent, stream 159, is continuously reintroduced into the extraction zone I.

We claim as our invention:

1. In the process for the recovery of oils from seeds containing extractable oils, comprising steps for contacting seeds having a water content of between about 9 and 13 percent by weight with an isopropanol-based extraction solvent in an extraction zone to obtain an extract of desired seedoils in the solvent, cooling the extract, and phase-separating the cooled extract into a lower liquid oil phase which is rich in seedoils and an upper liquid solvent phase containing recovered solvent, the improvement which comprises dividing the recovered solvent phase of the phase separation into a first division fraction comprising between about 60 and 95 percent of the solvent phase and a second division fraction comprising between about 5 and 40 percent of the solvent phase, directly recycling said first division fraction to the extraction zone as extraction solvent, distilling the second division fraction to yield a liquid distillation bottoms product comprising water and free fatty acids and a vapor distillation overhead product consisting essentially of a constant boiling mixture of isopropyl alcohol and water, condensing said vapor overhead to a liquid distillation overhead product, and recycling said liquid distillation overhead product to the extraction zone as extraction solvent.

2. In the process for the recovery of oils from seeds containing extractable oils, comprising steps for
    contacting the seeds, having a water content of between about 9 and 13 percent by weight, with an isopropanol-based extraction solvent to obtain an extract of seedoils in solvent and a seed meal,
    cooling and phase-separating the extract into a lower liquid oil phase and an upper liquid solvent phase, and
    separating from the oil phase of the phase separation step a recovered oil phase solvent,
    the improvement which comprises
    dividing said upper liquid solvent phase into a first division fraction consisting of between about 60 and 95 percent of the solvent phase and a second division fraction consisting of between about 5 and 40 percent of the solvent phase,
    directly recycling said first division fraction to the extraction zone as extraction solvent,
    distilling together the second division fraction and the recovered oil phase solvent to obtain an overhead vapor consisting essentially of a constant boiling mixture of isopropanol alcohol and water, and a liquid bottoms,
    condensing said overhead vapor and
    recycling the condensed overhead vapor to the extraction zone as extraction solvent.

3. In the process for the recovery of oils from seeds containing extractable oils, comprising steps for
    contacting the seeds, having a water content of between about 9 and 13 percent by weight, with an isopropanol-based extraction solvent to obtain an extract of seedoils in solvent and a seed meal, cooling and phase-separating the extract into a lower liquid oil phase and an upper liquid solvent phase, separating from the seed meal a recovered meal solvent, and separating from the oil phase of the phase separation step a recovered oil phase solvent, the improvement which comprises dividing said upper liquid solvent phase into a first division fraction consisting of between about 60 and 95 percent of the solvent phase and a second fraction consisting of between about 5 and 40 percent of the solvent phase, directly recycling said first division fraction to the extraction zone as extraction solvent, distilling together the second division fraction, the recovered meal solvent, and the recovered oil phase solvent to obtain an overhead vapor consisting essentially of a constant boiling mixture of isopropyl alcohol and water, and a liquid bottoms, condensing said overhead vapor, and recycling the condensed overhead vapor to the extraction zone as extraction solvent.

4. The process of any one of claims 1, 2 and 3, wherein the seeds have a water content of between about 10 and 12 percent by weight.

5. The process of any one of claims 1, 2 and 3, wherein the first division fraction consists of between about 65 and 85 percent of the solvent phase and the second division fraction consists of between about 15 and 35 percent of the solvent phase.

* * * * *